United States Patent [19]
Buxton et al.

[11] 3,922,586
[45] Nov. 25, 1975

[54] GROUND FAULT DETECTING POWER OUTLET

[75] Inventors: Aldon L. Buxton, Stone Mountain; Leonard Donnerstag, Atlanta, both of Ga.; Carl E. Gryctko, Haddon Heights, N.J.

[73] Assignee: I-T-E Imperial Corporation, Spring House, Pa.

[22] Filed: Apr. 1, 1974

[21] Appl. No.: 456,759

[52] U.S. Cl............... 317/112; 335/18 R; 200/51 R
[51] Int. Cl.²........................................ H02B 1/10
[58] Field of Search ...... 174/52 R, 59; 317/18, 112, 317/119, 120; 335/18; 200/51 R, 51.05, 51.11

[56] References Cited
UNITED STATES PATENTS

| | | | |
|---|---|---|---|
| 3,324,260 | 6/1967 | Schumacher | 200/51 R |
| 3,743,891 | 7/1973 | Buxton | 317/112 |
| 3,806,845 | 4/1974 | Zubaty | 335/18 |
| 3,812,400 | 5/1974 | Gryctko | 335/18 |

Primary Examiner—Gerald P. Tolin
Attorney, Agent, or Firm—Ostrolenk, Faber, Gerb & Soffen

[57] ABSTRACT

A plug-in type power outlet fitting for an electric service panel is provided with ground fault interrupting capabilities. The power outlet fitting includes a three-prong duplex outlet portion electrically and mechanically secured to a ground fault detector-interruptor subassembly to form a unitary block-like structure.

6 Claims, 11 Drawing Figures

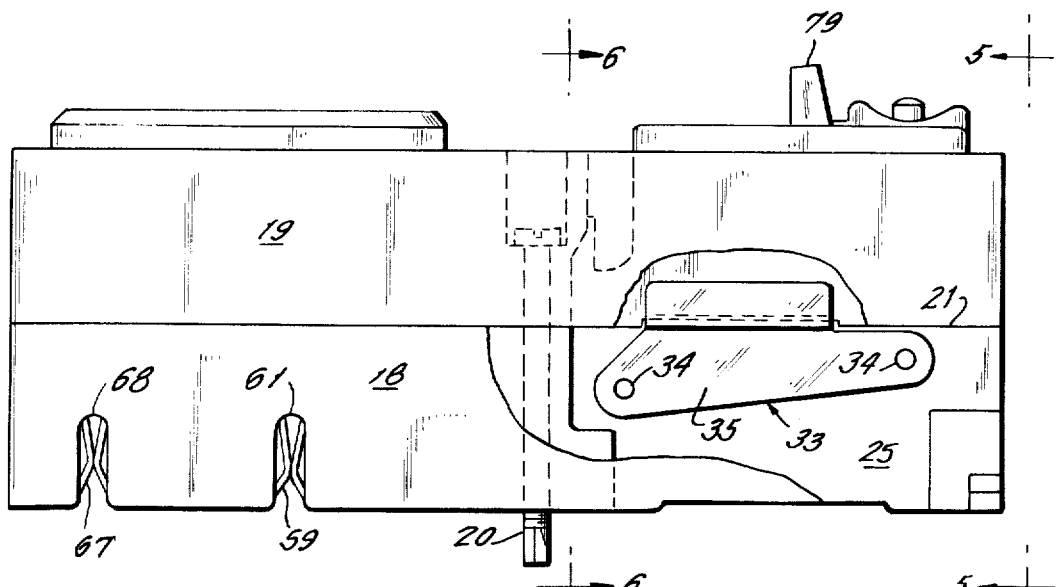
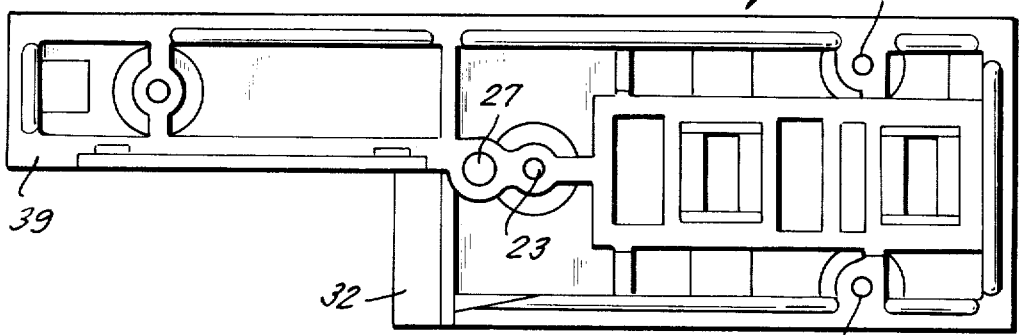
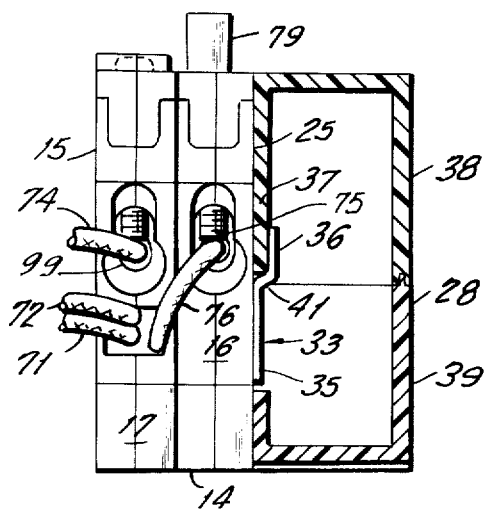
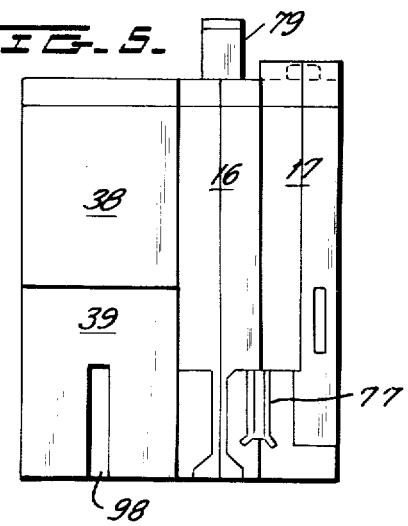

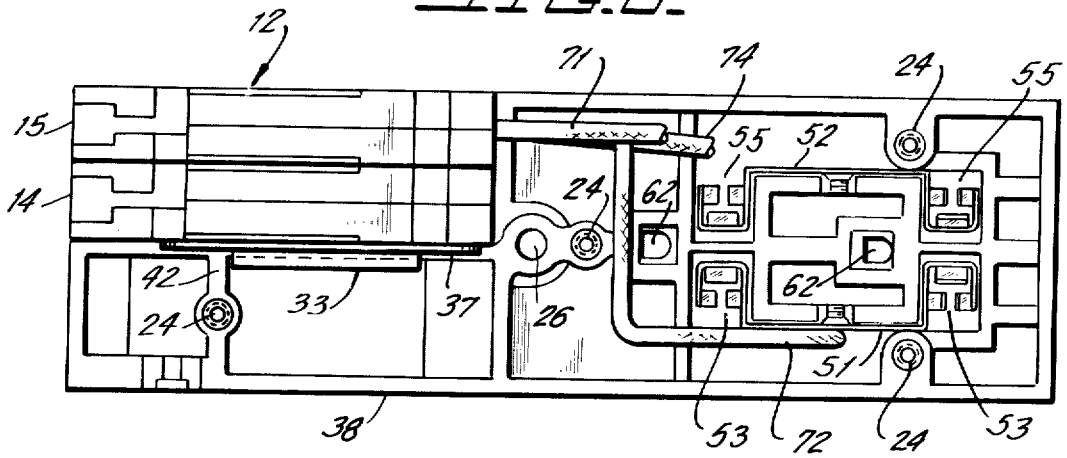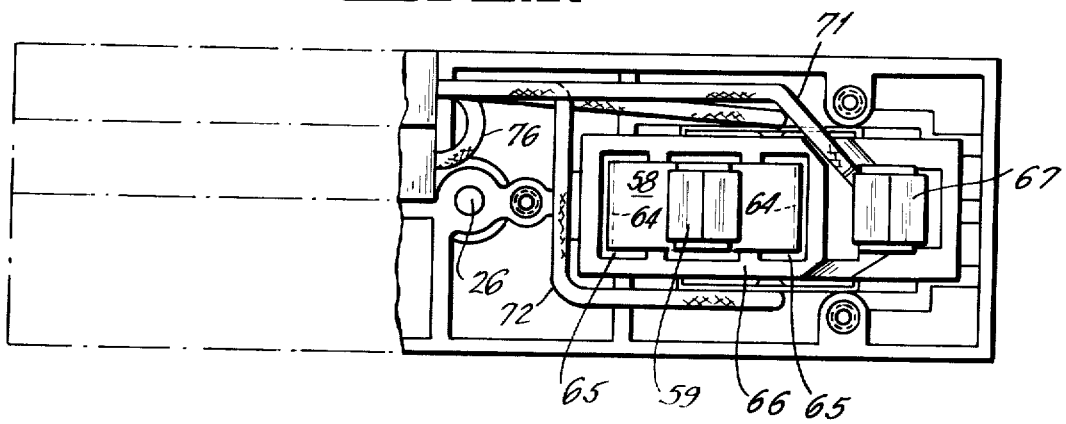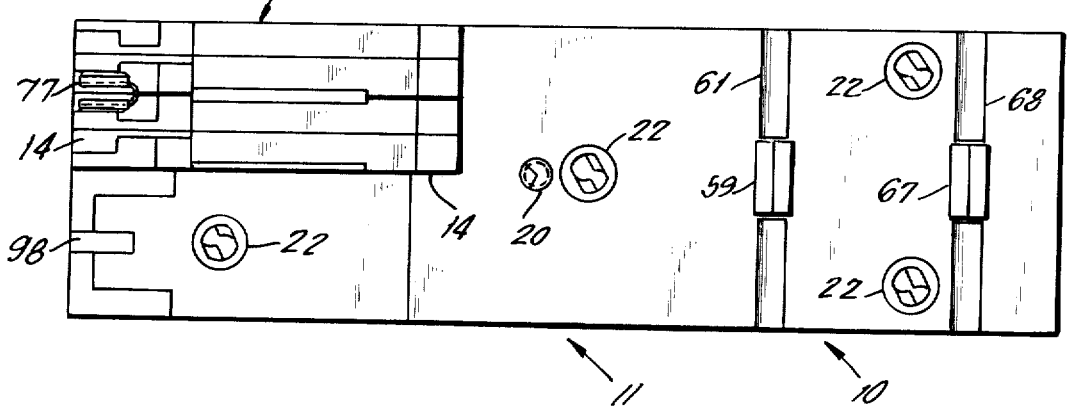

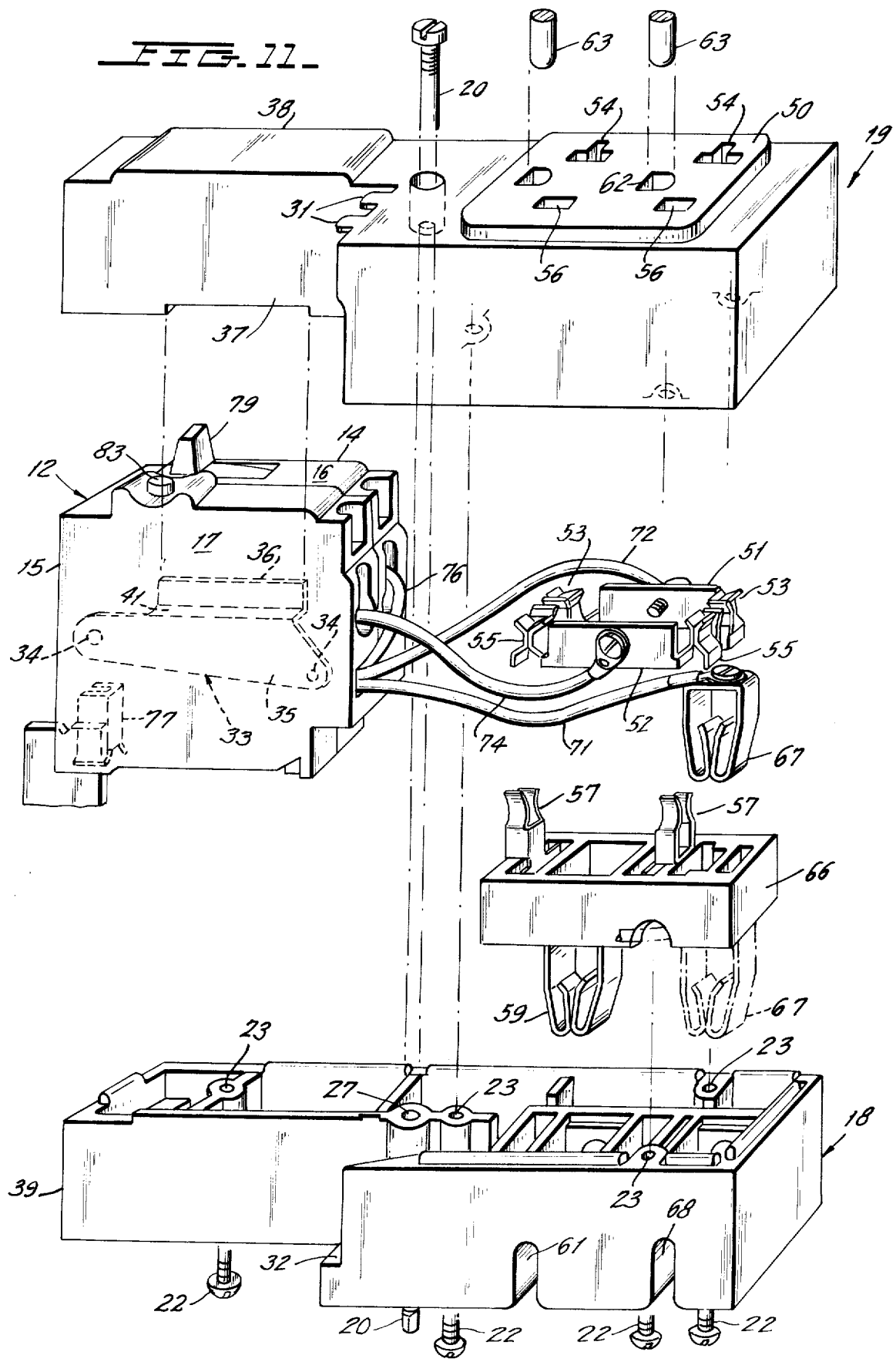

GROUND FAULT DETECTING POWER OUTLET

This invention relates to power outlet fittings for electric service panels and more particularly relates to power outlet fittings of this type which include receptacle means and ground fault detector-interrupter means in circuit with the receptacle means.

U.S. Pat. No. 3,743,891, issued July 3, 1973, to A. Buxton for a Plug-In Receptacle-Circuit Breaker Device Having Unitary Housing, discloses a very flexible electric service panel for temporary hookups constructed for plug-in line and neutral connections as well as plug-in connections to two hot conductors. The aforesaid U.S. Pat. No. 3,743,891 also discloses a power outlet fitting including a four contact receptacle with two of these contacts being connected to individual single pole automatic circuit breakers that are mechanically interconnected for simultaneous operation.

In accordance with the instant invention, a plug-in type power outlet fitting having ground fault detecting and interrupting capabilities is provided for use with the electric service panel disclosed in the aforesaid U.S. Pat. No. 3,743,891. In particular, the power outlet fitting of the instant invention includes a standard ground fault detector-interrupter of the type described in detail in copending U.S. patent application Ser. No. 334,840 filed Feb. 22, 1973, now U.S. Pat. No. 3,855,502 by V. G. Pardue et al. for a Ground Fault Interrupter Device, and assigned to the assignee of the instant invention. The power outlet fitting also includes a three-prong duplex receptacle electrically connected internally to the detector-interrupter. All electrical connections to the power outlet fitting from points external thereof are made by plug-in type connectors.

Accordingly, a primary object of the instant invention is to provide a novel construction for a power outlet fitting.

Another object is to provide a novel power outlet fitting having ground fault detecting and interrupting capabilities.

Still another object is to provide a power outlet fitting of this type which includes a standard ground fault detector-interrupter.

A further object is to provide a power outlet fitting of this type which requires only plug-in type line and load connections.

These objects as well as other objects of this invention will become readily apparent after reading the following description of the accompanying drawings in which:

FIG. 4 is a side elevation, partially sectioned, looking in the direction of arrows 4—4 of FIG. 1.

FIG. 5 is an end view looking in the direction of arrows 5—5 of FIG. 4.

FIG. 6 is a cross-section taken through line 6—6 of FIG. 4, looking in the direction of arrows 6—6.

FIG. 7 is a plan view of the rear housing section looking in the direction of arrows 7—7 of FIG. 2.

FIG. 8 is a rear view of the power outlet fitting with the rear housing section removed, taken through line 8—8 of FIG. 2, looking in the direction of arrows 8—8.

In FIG. 8 the line, neutral, and ground contacts as well as the insulating member for the latter are removed to reveal additional details of the forward housing portion.

FIG. 9 is a view similar to FIG. 8, with the line, neutral, and ground contacts together with the insulator for the latter being in their operative positions.

Figure 2:
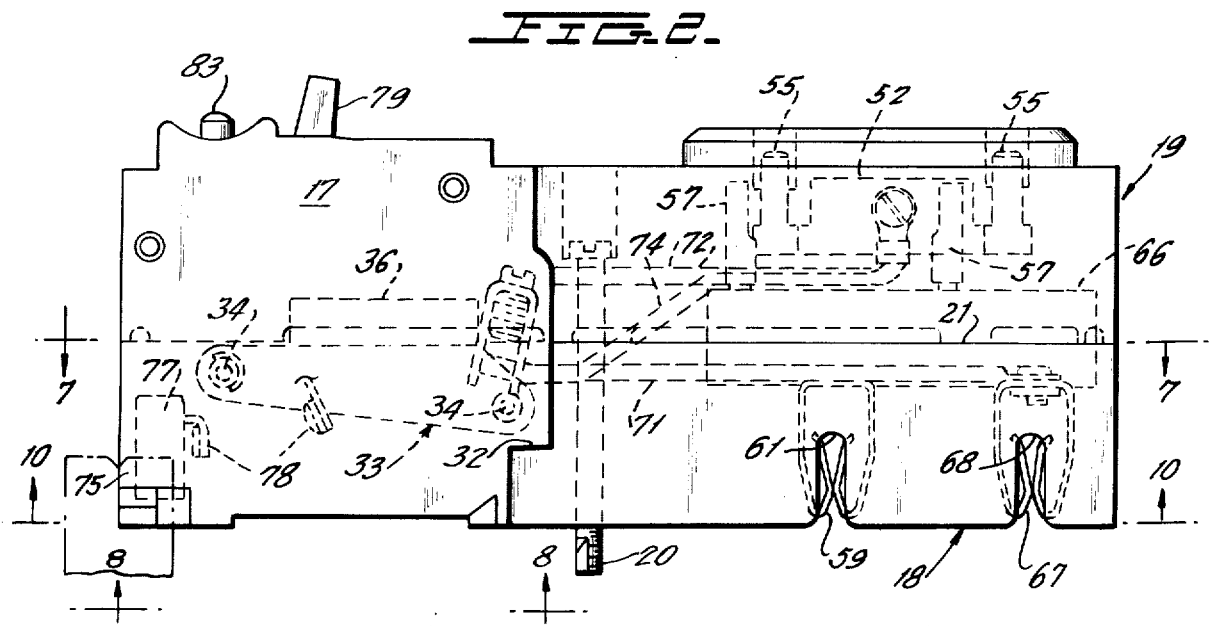
FIG. 2 is a side elevation of the power outlet fitting looking in the direction of arrows 2—2 of FIG. 1.
Figure 3:
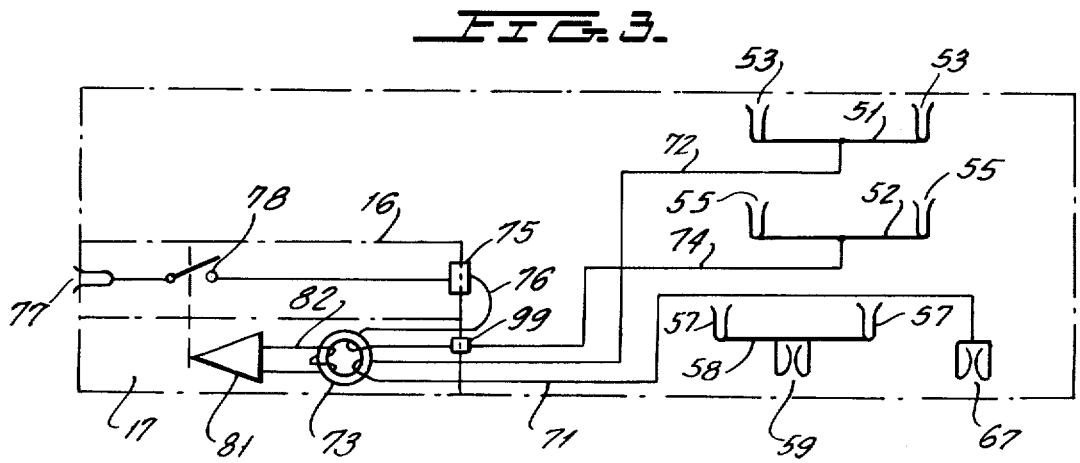
FIG. 3 is a schematic showing the basic electrical elements of the power outlet fitting.

FIG. 10 is a rear elevation looking in the direction of arrows 10—10 of FIG. 2.

FIG. 11 is an exploded perspective of the main elements of the power outlet fitting.

Now referring to the FIGURES, power outlet fitting 10 consists of three-contact duplex receptacle section 11 electrically and mechanically connected to ground fault detectorinterrupter section 12. The latter is described in detail in the aforesaid application Ser. No. 334,840, and includes circuit breaker module 14 and sensor module 15 provided with molded insulated housings 16, 17, respectively. Receptacle section 11 includes a molded insulated housing consisting of rear section 18 and forward section 19 mating along line 21 and secured together by four screws 22 which extend through clearance apertures 23 in rear housing section and are threaded into apertures 24 at the rear of forward housing section 19. Another screw 20 extends through clearance apertures 26, 27 of the respective housing sections 19, 18 for mechanically securing power outlet fitting 10 in an electric panel (not shown).

Figure 1:
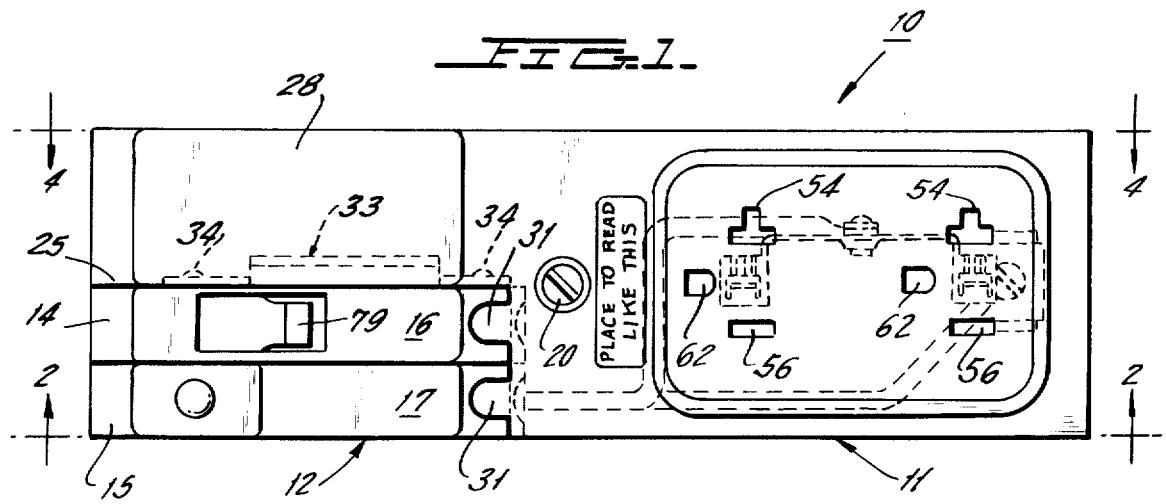
FIG. 1 is a plan view of a power outlet fitting constructed in accordance with teachings of the instant invention.

The width of unit 12 is approximately half the width of housing 18, 19 so that the latter is provided with a hollow extending portion 28 positioned alongside wall 25 of circuit breaker module 14 whereby the outline configuration of power outlet fitting 10 is generally rectangular. Rear movement of sensor-interrupter unit 12 with respect to receptacle section 11 is prevented by ledge 32 of rear housing section 18 engaged by a complementary formation of unit 12. Front and rear movement of unit 12 is prevented by stepped metal bracket 33 secured by rivets 34 to the side 25 of circuit breaker housing 16. Rear portion 35 of bracket 33 abuts side 25 of circuit breaker housing 16, offset forward portion 36 of bracket 33 hooks behind wall 37 in upper portion 38 of housing extension 28, and connecting portion 41 between bracket sections 35, 36 is clamped between upper and lower sections 38, 39 of housing extension 28. In addition forward portion 36 of bracket 33 is positioned with one end thereof abutting partition 42 of housing extension part 38 (FIG. 8) to prevent movement of unit 12 to the left of unit 11 with respect to FIG. 1. Rightward movement as well as upward movement with respect to FIG. 1 is blocked through direct engagement between units 11 and 12. Downward movement with respect to FIG. 1 is prevented by the cooperation between bracket 33 and wall 37.

Housing sections 18, 19 are hollow, being provided with internal formations to operatively position and retain the conducting elements. In particular, hot load and neutral load contact members 51, 52, of identical construction, are positioned by formations in forward housing section 19 so that neutral plug-in contacts 53, 53 are aligned with plug prong receiving apertures 54, 54 in the forward surface 50 of upper housing section 19. Similarly, prong engaging contacts 55, 55 of hot load contact member 52 are aligned with prong receiving apertures 56, 56 in surface 50. Plug prong engaging contacts 57, 57 are integrally formed with and disposed at opposite ends of strap 58 (FIG. 9) that supports plug-in contact 59 exposed at rear housing slot 61 to engage the grounding bar (not shown) of a panel. Contacts 57, 57 are aligned with prong receiving apertures 62, 62 in housing surface 50 so as to be engageable by equipment grounding plug prongs 63, 63 (FIG. 11). Strap 58 is generally U-shaped and is provided with arms 64, 64 that extend forward through aperture 65, 65 in insulating block 66. The rear surface of block 66 serves partly to operatively position panel neutral plug-in contact 67 that is accessible in transverse slot 68 at the rear of rear housing section 18 for engagement with the neutral bar (not shown) of a panel.

Insulated conductor 71 extends from panel neutral contact 67 through sensor housing 17 and emerges as insulated conductor 72 connected to load neutral contact means 51 after passing through sensing transformer core 73. Insulated conductor 74 extends from hot load contact means 52 to terminal 99 of sensing module 15. Conductor 74 then extends into housing 17 through core 73 and emerges from housing 17 as insulated conductor 76 connected to circuit breaker load terminal 75. Circuit breaker plug-in line terminal 77 is connected through circuit breaker contacts 78 to load terminal 75.

In a manner well known to the art, contacts 78 may be opened and closed manually by handle 79 that protrudes forward of housing 16. In addition, upon the detection of a ground fault, operational amplifier 81 fed by output winding 82 on core 73 is effective to automatically open contacts 78. Circuit breaker 14 is also provided with thermal and magnetic automatic trip means (not shown) that cause automatic opening of contacts 78 because of excessive current in the load circuit.

Rear housing section 18 is provided with slot 98 that provides clearance for the hot panelboard stab adjacent to the stab engaged by line terminal 77. Ears 31 protruding from forward housing section 19 are operatively positioned to block access to terminals 75 and 99 after assembly of sections 11 and 12. Test button 83, protruding from the forward end of detector housing 17, is operated in a manner well known to test operability of sensing module 15.

Although in the foregoing there have been described preferred embodiments of this novel invention, many variations and modifications will now become apparent to those skilled in the art, and it is preferred therefore that the instant invention be limited not by the disclosure contained herein but only by the appending claims.

The embodiments of the invention in which an exclusive privilege or property is claimed are defined as follows:

1. A power outlet device removably mountable in an electric power distribution panel, said device including a ground fault detector-interrupter first means, a receptacle means, and an elongated unitary generally block-like insulating housing means including a first housing portion for said first means and a second housing portion for said receptacle means; said second housing portion including a front section, a rear section and retaining means securing said sections together and securing said first and second housing portions together; said first means including a line terminal at one end of said first housing portion operatively engaging a distribution panel hot conductor positioned at the rear of said first housing portion; said receptacle means including hot load contact means, grounding contact means, line neutral contact means and load neutral contact means; first conductor means within said housing means extending through said first means and connecting said hot load contact means to said line terminal; said hot load contact means being operatively engaged by plug prong means extending through opening means in the front of said second housing poriton; said grounding contact means having a first portion operatively engaged by plug prong means extending through opening means in the front of said second housing portion and having a second portion engaged with a panel ground conductor at the rear of said device; said load neutral contact means being operatively engaged by plug prong means extending to opening means in the front of said second housing portion; said hot load and load neutral contact means having substantially identical constructions; a block-like insulating member disposed within said second housing portion between said front and rear sections; said grounding contact means extending through said member with said first and second portions of said grounding contact means projecting from said member at its front and rear, respectively; said line neutral contact means being maintained by said member at a position both insulated from said load neutral contact means and operatively engaged with a panel neutral conductor at the rear of said device; second conductive means within said housing extending through said first means and connecting said line and load neutral contact means.

2. A power outlet device as set forth in claim 1 in which the retaining means includes a bracket secured to one side of said first housing portion and operatively engaged with a sidewall of an extending section of said second housing portion.

3. A power outlet device as set forth in claim 2 in which a part of the bracket is sandwiched between said front and rear sections.

4. A power outlet device as set forth in claim 1 in which the first means includes cooperating contact means constituting a portion of the first conductor means; and an operating handle operatively connected to said contact means for selectively opening and closing the latter; said handle being accessible at the front of said housing means for manual operation.

5. A power outlet device as set forth in claim 1 in which the line terminal, the second portion of the grounding contact means and the line neutral contact means each constitutes a plug-in type terminal.

6. A power outlet device as set forth in claim 1 in which said line terminal, said second portion of the grounding contact means and said line neutral contact means each constituting a plug-in type terminal; said receptacle means including first and second plug-prong receiving receptacles connected in electrical parallel.

* * * * *